United States Patent
Klausner et al.

(10) Patent No.: US 7,450,972 B2
(45) Date of Patent: Nov. 11, 2008

(54) WIRELESS COMMUNICATION SYSTEM FOR AT LEAST ONE CONTROL UNIT IN A VEHICLE

(75) Inventors: Markus Klausner, Gerlingen (DE); Ralf Vogt, Kornwestheim (DE); Jacek-Christoph Wojcik, Bietigheim-Bissingen (DE); Wolf-Henning Rech, Nailingen (DE)

(73) Assignee: Robert Bosch GmbH, Stuttgart (DE)

( * ) Notice: Subject to any disclaimer, the term of this patent is extended or adjusted under 35 U.S.C. 154(b) by 707 days.

(21) Appl. No.: 10/636,858

(22) Filed: Aug. 7, 2003

(65) Prior Publication Data
US 2004/0125780 A1 Jul. 1, 2004

(30) Foreign Application Priority Data
Aug. 17, 2002 (DE) .................... 102 37 717

(51) Int. Cl.
H04M 1/00 (2006.01)
H04B 7/00 (2006.01)
(52) U.S. Cl. .................. 455/569.2; 455/575.9; 455/41.2
(58) Field of Classification Search .................. 370/338, 370/310, 385; 340/438, 439, 425.5, 539.1, 340/539.24; 455/41.2, 39, 73, 91, 569.2, 455/575.9; 701/29, 33
See application file for complete search history.

(56) References Cited

U.S. PATENT DOCUMENTS

| | | | | |
|---|---|---|---|---|
| 6,025,776 A | * | 2/2000 | Matsuura | 340/438 |
| 6,408,232 B1 | * | 6/2002 | Cannon et al. | 701/29 |
| 6,594,579 B1 | * | 7/2003 | Lowrey et al. | 701/123 |
| 6,677,854 B2 | * | 1/2004 | Dix | 340/438 |
| 6,744,352 B2 | * | 6/2004 | Lesesky et al. | 340/431 |
| 6,807,469 B2 | * | 10/2004 | Funkhouser et al. | 701/33 |
| 6,819,236 B2 | * | 11/2004 | Kawai et al. | 340/539.24 |
| 6,933,842 B2 | * | 8/2005 | Oesterling et al. | 340/539.24 |
| 7,024,291 B2 | * | 4/2006 | Sudou | 701/30 |

FOREIGN PATENT DOCUMENTS

DE 44 44 727 6/1996

\* cited by examiner

*Primary Examiner*—Sonny Trinh
(74) *Attorney, Agent, or Firm*—Kenyon & Kenyon LLP

(57) ABSTRACT

A wireless communication system for control units in a vehicle, where a Gateway controller is provided, which may be linked via a first interface to least one microcontroller of a control unit of the vehicle, and which may be connected via a second interface to a wireless communications connection, the second interface encompassing at least one interface element which allows the broadband transmission of data via the wireless communications interface.

17 Claims, 1 Drawing Sheet

WIRELESS COMMUNICATION SYSTEM FOR AT LEAST ONE CONTROL UNIT IN A VEHICLE

FIELD OF THE INVENTION

The present invention is directed to a wireless communication system for at least one control unit in a vehicle having, e.g., a vehicle-independent computer unit, for measuring, application, and/or development purposes, and/or for repair and diagnostic purposes.

BACKGROUND INFORMATION

Wireless communication systems may be used, such as German Patent Application No. 44 44 727, for example, which proposes connecting various control units, which are interconnected via a data bus, in a motor-vehicle, via a wireless interface to an external read unit. In this context, an interface module provides the connection to the wireless interface. This module is assigned to a selected control unit. As examples of data transmissions, those in the infrared or high-frequency range are mentioned. No reference is made of a specific implementation of this interface, particularly with regard to the requirements for a high transmission rate, interference resistance, and/or transmitting capacity for a data transmission from the engine compartment, etc.

SUMMARY OF THE INVENTION

By using a broadband, standardized interface for the wireless communication between a control unit in the vehicle, e.g., in the engine compartment, and an external computer unit which may be situated in the vehicle and independent of the vehicle, the necessary requirements for a high transmission rate are fulfilled. "Broadband" is understood here to be a transmission rate of at least several Mbit/second.

One advantage associated with the use of a standardized interface is the availability of integrated, standardized modules, making it possible to reduce the outlay required to implement the wireless communications system. In this context, the use of commercial WLAN products based on the IEEE 802.11 standard may be advantageous. This standard is the basis of a broadband communication characterized by high interference resistance.

The wireless communication system may be used in the application and system development of control units in the engine compartment of a vehicle, the vehicle-independent computer unit being situated in the passenger compartment or in the cargo space of the vehicle. In this application case, the standardized WLAN (wireless local area network) may be suited as an interface. Besides the requisite high transmission rate, it also fulfills the special requirements for data transmission from the engine compartment.

A Gateway microcontroller may be used. In an exemplary embodiment, it may be part of a control unit in the vehicle, which is connected to a WLAN card, whose electrical interface simulates the corresponding interface of a personal computer. This may eliminate the need for wiring between the control unit and the PC for measuring and/or application purposes. In the process, the wiring configuration in a PC is simulated using hardware and software. The simulation is achieved by the Gateway microcontroller.

BRIEF DESCRIPTION OF THE DRAWING

The FIGURE shows an exemplary embodiment of the wireless communications system, made up of a control unit in, e.g., the engine compartment, and a measuring computer in the vehicle, which are interconnected via a wireless communications interface for the mutual exchange of data.

DETAILED DESCRIPTION

Figure 1:
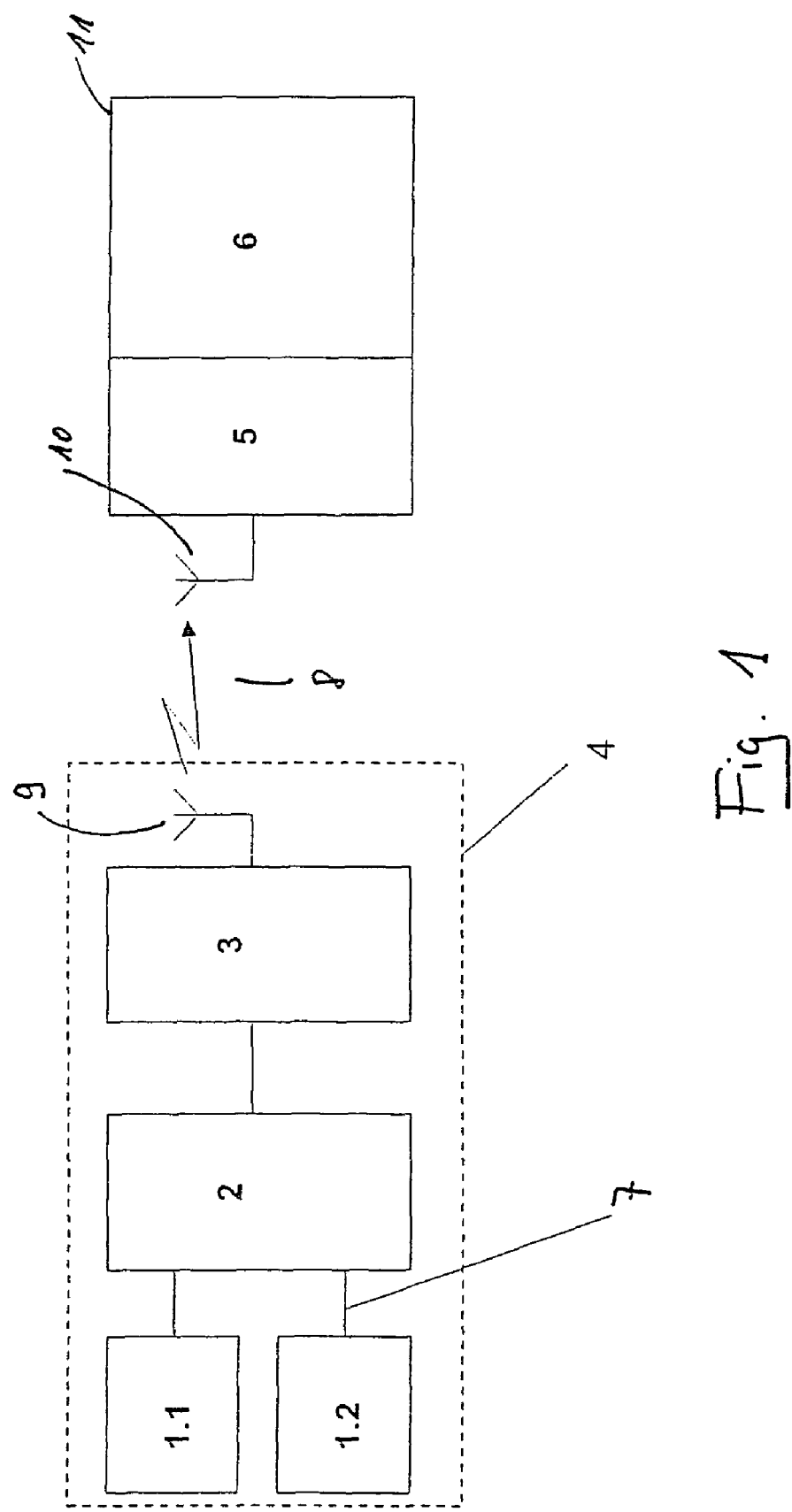

The FIGURE shows a control unit 4, which is mounted in the motor vehicle, e.g., in the engine compartment. Various components of control unit 4 utilized in the procedure described in the following, are illustrated in the FIGURE. These include microcontroller(s) (1.1, 1.2) of the control unit, which are linked via a serial interface 7 (e.g., SPI, SCI) or via a parallel interface (bus) to a Gateway microcontroller 2. This Gateway microcontroller 2 is connected, in turn, to an interface component 3, which provides a broadband connection via an antenna 9 to an air interface 8. In the exemplary embodiment of the FIGURE, component 3 is, e.g., a WLAN-PCMCIA card, which provides operational control to the standardized WLAN interface. In the exemplary embodiment of the FIGURE, components 2 and 3 are integrated in control unit 4, the control unit also providing the voltage supply for these components. The components may be mounted on a separate printed circuit board, which is arranged as the second layer (position)in the housing of the control unit. In other embodiments, components 2 in 3, together with antenna 9, may make up a separate control unit, which is connected via interface 7 with one or more control units in the vehicle.

In addition, an external read unit 11 is provided, e.g., a laptop or a measuring computer, which is situated in the vicinity of control unit 4, thus, e.g., in the passenger compartment of the motor vehicle or in its cargo space. It includes the actual computer 6, as well as an interface element 5, which, by way of antenna 10, is used to communicate via the air interface. In an exemplary embodiment of a WLAN communications connection, module 5 represents a WLAN module, for example, likewise a WLAN-PCMCIA card, a WLAN-PCI card or a WLAN base station.

The connection between the two units may be configurable as a broadband connection via the air interface. In this context, in the exemplary embodiment of the FIGURE, a WLAN component (e.g., a PCMCIA card or the like) is directly integrated in a control unit in the engine compartment, a PC interface being simulated using hardware and software, and the WLAN component being driven by the Gateway controller likewise integrated in the control unit. In addition to the WLAN communications connection discussed above, within the framework of the exemplary embodiment of The FIGURE, the corresponding components in other exemplary embodiments are replaced by UMTS modules or by a corresponding communications chip set for data communications in cellular networks. In this case, component 5 is a modem. The advantage of this approach may be that data from control unit 4 are not only able to be transmitted to a measuring computer in the passenger compartment or cargo space of the motor vehicle, but also to a measuring computer outside of the motor vehicle.

The method of functioning of the system illustrated in the FIGURE is as follows. The data to be transmitted to measuring computer 11 are transmitted by microcontroller(s) 1.1, 1.2 via serial or parallel interface 7 to Gateway controller 2. This controller reads in the data via a polling process or in a process triggered by interrupts. In the Gateway controller, software is used to convert the data for transmission using an Internet protocol (IP). In this context, the conversion operation includes a re-formatting and a re-segmenting of the data, in order to transmit the control-unit data on the basis of the Internet protocol using special data communications protocols, such as TCP or UDP. Superimposed on these communications protocols is also an additional logic protocol, the actual measuring technique protocol. In this context, Gateway controller 2 assumes the function of triggering WLAN card 3, whose electrical interface is a simulation of the corresponding interface of a personal computer. The simulation is achieved by the Gateway microcontroller.

The reformatted data are then transmitted using the communications protocol from WLAN card 3 to component 5 and, from there, to the corresponding software in measuring computer 6. Since the data transmission between the components is bidirectional, the transmission of data from measuring computer (6) to control unit (4) takes place correspondingly in the reverse order.

In the exemplary embodiment, WLAN components are used which fulfill the requirements with respect to transmission rate, interference resistance, and transmitting capacity for a data transmission from the engine compartment. In this connection, the commercial availability of integrated, standardized modules is also advantageous. In other exemplary embodiments, communications modules specially developed for data transmission from the engine compartment, such as front-end modules, basic band chip modules, communications controllers, etc., may be used.

In another embodiment, the WLAN components are replaced by communications components specially developed for the application purpose, and the communications protocol is replaced by a protocol specially developed for the application case within the framework of the development and application of control units in the engine compartment of a motor vehicle.

The above-mentioned components encompass all sub-components (basic band chip, front-end) required for a wireless communication.

What is claimed is:

1. A wireless communication system for at least one control unit in a vehicle, comprising:
    a gateway controller, which is linked by a first interface to least one microcontroller of the at least one control unit of the vehicle, and which is connected by a second interface to a wireless communications connection, wherein the second interface includes an interface component that provides a broadband connection via a wireless communications interface, wherein the gateway is connected to the at least one microcontroller, and wherein the gateway controller includes a gateway microcontroller and the simulation is performed by the gateway microcontroller.

2. The system of claim 1, wherein the gateway controller, the interface component, and the at least one microcontroller are integrated in one of the at least one control units.

3. The system of claim 2, wherein the gateway controller and the microcontroller of the control unit are in a shared control unit, and the gateway controller and the interface component are on a separate printed circuit board which is arranged at a second position in the housing of the control unit.

4. The system of claim 2, wherein at least one of the control unit and the gateway controller is in the engine compartment of the vehicle.

5. The system of claim 1, further comprising:
    a computer, wherein the gateway controller communicates via the second interface with the computer, wherein the computer includes an interface component for the wireless communications interface and at least one of a measuring computer and a laptop.

6. The system of claim 5, wherein the computer is in one of a passenger compartment and the cargo space of the motor vehicle.

7. The system of claim 1, wherein the gateway controller collects data from the least one microcontroller, converts the data for transmission purposes via an Internet protocol to provide converted data, and transmits the converted data by at least one of triggering the interface component of the second interface and receiving the converted data via the second interface.

8. The system of claim 1, wherein the interface to the interface component is configured by simulating an interface of a PC using hardware and software.

9. The system of claim 1, wherein the interface component is a component for implementing a standardized wireless protocol.

10. The system of claim 1, wherein the broadband connection includes a transmission rate of at least one Mbits/second.

11. The system of claim 1, wherein the broadband connection includes a transmission rate of at least several Mbits/second.

12. The system of claim 1, wherein the gateway controller includes software to convert data, from the at least one control unit, for transmission via the wireless communications interface using an Internet protocol.

13. The system of claim 12, wherein the conversion of the data by the gateway controller includes re-formatting the data for transmission via the Internet protocol.

14. The system of claim 12, wherein the conversion of the data by the gateway controller includes re-segmenting the data for transmission via the Internet protocol.

15. The system of claim 12, wherein the transmission using the Internet protocol includes using at least one of: TCP or UDP.

16. A wireless communication system for a control unit in a vehicle, comprising:
    a gateway controller, which is linked by a first interface to a microcontroller of the control unit of the vehicle, and which is connected by a second interface to a wireless communications connection, wherein the second interface includes an interface component that provides a broadband connection via a wireless communications interface,
    wherein the gateway controller includes software to convert data, from the control unit, for transmission via the wireless communications interface using an Internet protocol, and
    wherein the gateway controller includes a gateway microcontroller and the simulation is performed by the gateway microcontroller.

17. A wireless communication system for a control unit in a vehicle, comprising:
    a gateway controller, which is linked by a first interface to a microcontroller of the control unit of the vehicle, and which is connected by a second interface to a wireless communications connection, wherein the second interface includes an interface component that provides a broadband connection via a wireless communications interface,
    wherein the gateway controller includes software to convert data, from the control unit, for transmission via the wireless communications interface using an Internet protocol, wherein the conversion of the data by the gateway controller includes at least one of:
  re-formatting the data for transmission via the Internet protocol, or
  re-segmenting the data for transmission via the Internet protocol, and wherein the gateway controller includes a gateway microcontroller and the simulation is performed by the gateway microcontroller.

* * * * *